March 5, 1957 F. LUX 2,783,610
DIAL AND CASING STRUCTURE FOR A TIMER OR LIKE MECHANISM
Filed Nov. 16, 1954

INVENTOR
Frederick Lux
BY Rockwell Bachelor
ATTORNEYS

United States Patent Office 2,783,610
Patented Mar. 5, 1957

2,783,610

DIAL AND CASING STRUCTURE FOR A TIMER OR LIKE MECHANISM

Frederick Lux, Waterbury, Conn., assignor to The Lux Clock Manufacturing Company, Inc., Waterbury, Conn., a corporation of Connecticut Application November 16, 1954, Serial No. 469,113

1 Claim. (Cl. 58—53)

This invention relates to a dial and casing structure for a timer or like mechanism, and more particularly to a portable timer adapted to rest upon a horizontal surface. Timers of the character to which the invention relates usually comprise a cup-shaped casing within which is contained a clockwork driving a shaft which extends through the front wall or cover of the casing and also through a dial member having suitable indicia thereon. The shaft of the timer drives a pointer or like member to cooperate with the indicia so as to enable the operator to set the timer for the proper interval of time.

A bell or gong is secured at the back of the casing opposite the dial and usually a striker is actuated by the clockwork to strike the gong at the end of a measured time interval.

The casing is usually open at its front face in order that the clockwork mechanism may be placed therein, and this open face is covered by a face plate which is secured to the casing. The dial plate having indicia thereon is then secured to the front plate and the pointer is nonrotatably attached to the shaft. It will be seen that as the pointer is nonrotatably secured to the shaft, it will occupy a fixed position when the clockwork returns the shaft to its zero position or position of rest. The dial plate should, therefore, be secured to the casing in the proper position so that the pointer will, at this time, point to zero. With the construction usually employed, this is somewhat difficult as it is hard to precisely locate the dial plate with respect to the casing and a slight error in position will result in the improper registration of the pointer with the dial plate.

In accordance with the present construction the usual cover plate for the casing is omitted and the dial plate is secured directly to the open face of the casing which contains the clock mechanism, this dial plate having the usual indicia thereon. Convenient means are arranged for securing the plate in place. As illustrated, the open face of the case is provided with a flange which extends radially outwardly from the case and the peripheral edge of the dial plate is crimped over this flange to secure the parts together without the use of extraneous fastening means. In order to insure proper registration of the dial plate with the casing, the flange on the casing is provided with an extended portion which fits closely between spaced shoulders on the dial plate so that the latter will be properly located with respect to the casing for proper registration of the pointer with the indicia on the dial.

Also formed integrally with the dial is a rearwardly extending supporting flange or plate adapted to engage a supporting surface such as a table, counter or the like to maintain the timer in substantially upright position. Thus the dial plate not only performs its own function but also the function of the cover for the casing, permitting the elimination of the usual cover, and a part of the dial plate also forms the support for the mechanism.

One object of the present invention is to provide a casing and dial plate for a timer which shall be of simple construction and economical to manufacture.

A further object of the invention is to provide a casing structure for a timer mechanism wherein the usual casing cover and dial plate consist of a single member, and this member is also provided with a part to serve as a support for the mechanism.

Still another object of the invention is to provide a timer mechanism with a casing and a dial plate serving as a cover for the casing, the casing and dial plate having interengaging means by which the two may be readily secured together and also having integrally formed interengaging means by which the dial plate may be properly located with respect to the casing.

To these and other ends the invention consists in the novel features and combinations of parts to be hereinafter described and claimed.

Figure 1:
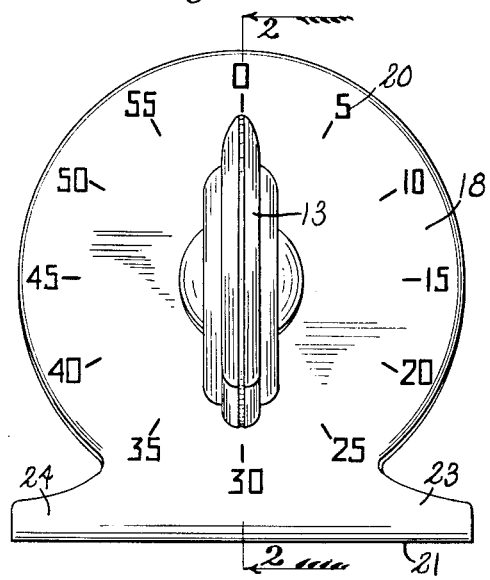
Fig. 1 is a front elevational view of a timer embodying my invention.
Figure 2:
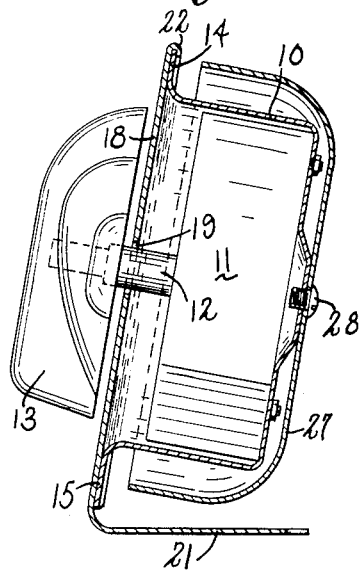
Fig. 2 is a sectional view on line 2—2 of Fig. 1.

To illustrate a preferred embodiment of my invention, I have shown in the drawings a timer structure comprising an open-faced casing 10 of generally cup-shaped form, this casing containing a clock mechanism 11 which may be of the usual form. Driven by the clockwork mechanism is a shaft 12 which extends without the casing and also through the dial plate as will be later described, and upon the extended end of the casing is nonrotatably mounted a pointer or indicator 13.

As stated, the front face of the casing 10 is open and the wall of the casing is provided with a peripheral outwardly and radially extending flange 14. At the lower portion of the cup-shaped member this flange is extended downwardly or in a radial direction, as shown at 15, the extended portion being provided at each end with a shoulder designated by the numerals 16 and 17, the function of which will hereinafter appear.

Instead of providing the usual casing cover, this function is served in the present structure by a dial plate 18 which at its central portion has an opening 19 through which extends the shaft 12. While the dial plate may be of any shape, it is illustrated as being of generally circular form and indicia 20 are provided around the periphery of its front face to cooperate with the pointer 13 in the usual manner.

At its lower portion the material of the dial plate is bent rearwardly to form a substantially horizontally extending base or supporting member 21 which is adapted to rest upon a table, counter or other supporting surface and support the dial 18 and the casing 10 attached thereto in a substantially upright position. It will be noted, however, that the angle between the supporting member or flange 21 and the plane of the dial plate 18 is slightly less than a right angle so that the latter may be inclined rearwardly to some extent.

Figure 3:
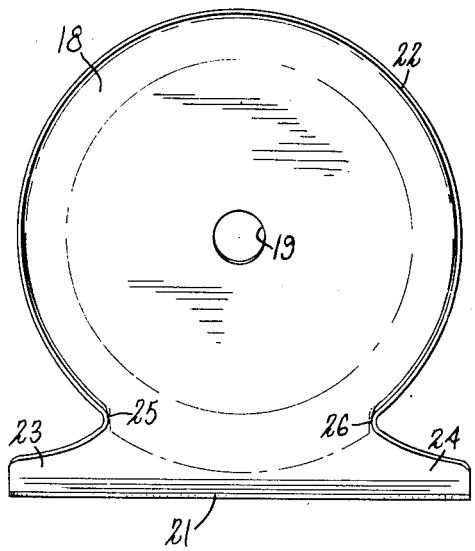
Fig. 3 is a rear elevational view of the dial plate and integral supporting flange.

As shown in Fig. 3, the dial plate is provided at its peripheral edge with a rearwardly extending lip 22 which lip extends downwardly to the laterally extending wings 23 and 24 on the lower portion of the plate and also along the upper surface of these wings. At the junction of the circular portion of the dial plate and the wings 23 and 24, this lip provides two shoulders 25 and 26 which serve to locate the position of the dial plate on the casing as will be hereinafter explained.

Figure 4:
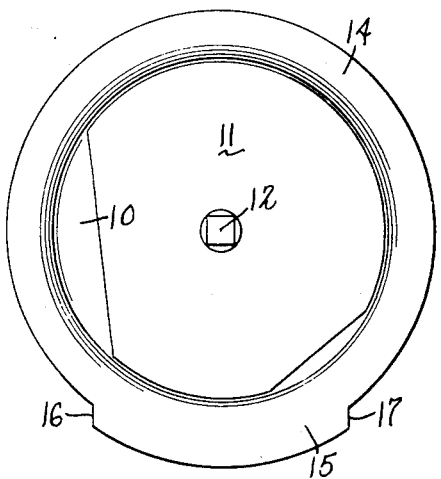
Fig. 4 is a front view of the cup-shaped casing with the dial plate removed therefrom.

When the clock mechanism has been assembled in the casing 10, as shown in Fig. 4, the dial plate is applied thereto with the peripheral edge of the flange 14 lying within the rearwardly extending lip 22 on the dial plate. In this position of the parts, as shown in Fig. 3, the shoulders 16 and 17 on the extension 15 of the flange 14 will fit snugly between the shoulders 25 and 26 formed by the lip 22 on the dial plate so that the casing will be properly located with respect to the dial plate so that the pointer 13 will always point to the zero indication on the dial at the rest position of the clock mechanism. With the parts in this position, the lip 22 is then crimped over the peripheral edge of the flange 14 to secure the dial plate to the casing in the position determined by the snug fit of the shoulders 16 and 17 on the casing between the shoulders 25 and 26 on the dial plate. Thus the dial plate is conveniently secured to the casing by interengaging means formed integrally with these two members and the position of the dial plate with respect to the casing is also determined by means formed integrally with the casing and dial plate.

A bell or gong member 27 may be secured to the back of the casing 10 by the screw 28 in order that the timer may give a signal at the end of the measured time interval. As the gong and its associated parts are of usual construction, no further description thereof is necessary.

While I have shown and described a preferred embodiment of my invention, it will be understood that it is not to be limited to all of the details shown, but is capable of modification and variation within the spirit of the invention and within the scope of the claim.

What I claim is:

In a timer casing construction, a dial plate having an upper portion of generally circular outline and a lower portion comprising wing members extending outwardly from the circular portion to provide a restricted portion therebetween, said lower portion having a rearwardly extending flange to provide a support, and a cup-shaped casing having an open face and a flange extending radially outwardly at said face, said flange having an extended portion provided with shoulders at its side edges, said plate having a rearwardly extending peripheral lip to engage said shoulders at the restricted portion of the plate, and said lip being crimped over said flange to secure the dial plate to the casing and orient the plate with respect to the casing.

References Cited in the file of this patent

UNITED STATES PATENTS

| | | |
|---|---|---|
| 1,900,696 | Day | Mar. 7, 1933 |
| 2,044,314 | Mattman | June 16, 1936 |
| 2,258,474 | Simmons | Oct. 7, 1941 |